(12) United States Patent
Taxier et al.

(10) Patent No.: US 8,640,227 B2
(45) Date of Patent: Jan. 28, 2014

(54) APPARATUS AND METHODS FOR DYNAMIC PICTORIAL IMAGE AUTHENTICATION

(75) Inventors: Karen Michelle Taxier, Highlands Ranch, CO (US); James Matthew White, Denver, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 763 days.

(21) Appl. No.: 12/236,430

(22) Filed: Sep. 23, 2008

(65) Prior Publication Data

US 2009/0320124 A1 Dec. 24, 2009

Related U.S. Application Data

(60) Provisional application No. 61/074,966, filed on Jun. 23, 2008.

(51) Int. Cl.
*G06F 12/00* (2006.01)
*G06F 12/14* (2006.01)
*G06F 17/30* (2006.01)
*G06F 15/16* (2006.01)
*G06F 21/00* (2013.01)

(52) U.S. Cl.
USPC ......... 726/19; 726/2; 726/9; 726/17; 713/183

(58) Field of Classification Search
USPC ....................................................... 726/17–19
See application file for complete search history.

(56) References Cited

U.S. PATENT DOCUMENTS

| 4,450,477 | A | 5/1984 | Lovett |
| 5,545,857 | A | 8/1996 | Lee et al. |
| 5,559,961 | A | 9/1996 | Blonder |
| 5,585,866 | A | 12/1996 | Miller et al. |
| 5,594,509 | A | 1/1997 | Florin et al. |
| 5,602,597 | A | 2/1997 | Bertram |
| 5,754,258 | A | 5/1998 | Hanaya et al. |
| 5,805,235 | A | 9/1998 | Bedard |

(Continued)

FOREIGN PATENT DOCUMENTS

| EP | 1063797 A2 | 12/2000 |
| EP | 1158793 A2 | 11/2001 |

(Continued)

OTHER PUBLICATIONS

International Searching Authority, European Patent Office, "International Search Report," mailed Dec. 7, 2009; International Application No. PCT/US2009/058457, filed Sep. 25, 2009.

(Continued)

*Primary Examiner* — Matthew T Henning
*Assistant Examiner* — Evans Desrosiers
(74) *Attorney, Agent, or Firm* — Ingrassia Fisher & Lorenz, P.C.

(57) ABSTRACT

Apparatus, systems and methods are provided for facilitating user authentication in a computing system based on pictorial discernment of images displayed to a user. Multiple images are displayed to a user, with each image having one or more distinguishing characteristics. Each symbol of the user's password is associated with a particular characteristic included in one of the displayed images. The user is properly authenticated if they select the images having the characteristics corresponding with the symbols of the user's password.

22 Claims, 14 Drawing Sheets

(56) References Cited

U.S. PATENT DOCUMENTS

| | | | |
|---|---|---|---|
| 6,005,565 | A | 12/1999 | Legall |
| 6,008,735 | A | 12/1999 | Chiloyan et al. |
| 6,020,930 | A | 2/2000 | Legrand |
| 6,118,498 | A | 9/2000 | Reitmeier |
| 6,147,714 | A | 11/2000 | Terasawa et al. |
| 6,334,217 | B1 | 12/2001 | Kim |
| 6,526,577 | B1 | 2/2003 | Knudson et al. |
| 6,650,248 | B1 | 11/2003 | O'Donnell et al. |
| 6,750,803 | B2 | 6/2004 | Yates et al. |
| 6,804,824 | B1 | 10/2004 | Potrebic et al. |
| 6,882,712 | B1 | 4/2005 | Iggulden et al. |
| 7,046,161 | B2 | 5/2006 | Hayes |
| 7,225,456 | B2 | 5/2007 | Kitsukawa et al. |
| 7,434,246 | B2 | 10/2008 | Florence |
| 7,584,492 | B2 | 9/2009 | Terakado et al. |
| 2001/0011953 | A1 | 8/2001 | Shintani et al. |
| 2001/0017672 | A1 | 8/2001 | Verhaeghe |
| 2002/0097229 | A1 | 7/2002 | Rose et al. |
| 2002/0122079 | A1 | 9/2002 | Kamen et al. |
| 2002/0191954 | A1 | 12/2002 | Beach |
| 2003/0066079 | A1 | 4/2003 | Suga |
| 2003/0191947 | A1 | 10/2003 | Stubblefield et al. |
| 2003/0193426 | A1 | 10/2003 | Vidal |
| 2004/0041723 | A1 | 3/2004 | Shibamiya et al. |
| 2004/0070593 | A1 | 4/2004 | Neely et al. |
| 2004/0172651 | A1 | 9/2004 | Wasilewski et al. |
| 2004/0218905 | A1 | 11/2004 | Green et al. |
| 2004/0230843 | A1 | 11/2004 | Jansen |
| 2004/0255336 | A1 | 12/2004 | Logan et al. |
| 2005/0010949 | A1 | 1/2005 | Ward et al. |
| 2005/0188402 | A1 | 8/2005 | de Andrade et al. |
| 2005/0268100 | A1 | 12/2005 | Gasparini et al. |
| 2006/0037047 | A1 | 2/2006 | DeYonker et al. |
| 2006/0051058 | A1 | 3/2006 | Rudolph et al. |
| 2006/0084409 | A1 | 4/2006 | Ghadiali |
| 2006/0095401 | A1 | 5/2006 | Krikorian et al. |
| 2007/0039019 | A1 | 2/2007 | Collier |
| 2007/0061724 | A1 | 3/2007 | Slothouber et al. |
| 2007/0079334 | A1 | 4/2007 | Silver |
| 2007/0130607 | A1 | 6/2007 | Thissen et al. |
| 2007/0277224 | A1* | 11/2007 | Osborn et al. ............ 726/2 |
| 2008/0010518 | A1 | 1/2008 | Jiang et al. |
| 2008/0024682 | A1 | 1/2008 | Chen |
| 2008/0034314 | A1 | 2/2008 | Louch et al. |
| 2008/0052245 | A1* | 2/2008 | Love ..................... 705/76 |
| 2008/0088495 | A1 | 4/2008 | Kawakita |
| 2008/0231762 | A1 | 9/2008 | Hardacker et al. |
| 2009/0007209 | A1 | 1/2009 | Kawai |
| 2009/0031343 | A1 | 1/2009 | Sharkey |
| 2010/0100909 | A1 | 4/2010 | Arsenault et al. |
| 2010/0169958 | A1* | 7/2010 | Werner et al. ............ 726/6 |

FOREIGN PATENT DOCUMENTS

| | | | |
|---|---|---|---|
| WO | 0001142 | A1 | 1/2000 |
| WO | 0178054 | A1 | 10/2001 |
| WO | 0178383 | A2 | 10/2001 |
| WO | 03043320 | A2 | 5/2003 |
| WO | 2006119269 | A2 | 11/2006 |
| WO | 2006127211 | A2 | 11/2006 |
| WO | 2007015047 | A2 | 2/2007 |

OTHER PUBLICATIONS

International Searching Authority, European Patent Office, "International Search Report and Written Opinion," mailed Dec. 18, 2009; International Application No. PCT/US2009/058456, filed Sep. 25, 2009.

International Searching Authority, European Patent Office, "International Search Report and Written Opinion," mailed Dec. 21, 2009; International Application No. PCT/US2009/058454 filed Sep. 25, 2009.

Anonymous "ZigBee," Wikipedia, the Free Encyclopedia [online], Sep. 26, 2008, XP002558439; retrieved from the Internet: <URL:http://en.wikipedia.org/w/index.php?title= ZigBee&oldid=241085798> [retrieved on Dec. 2, 2009].

Nintendo, "Wii Operations Manual System Setup," 2007.

Wikipedia, the free encyclopedia, "Dashboard (Software," Retrieved from the Internet on Oct. 6, 2008, http://en.wikipedia.org/w/index.php?title=Dashboard_(software)&printable=yes.

International Searching Authority, European Patent Office, "International Search Report," mailed Jan. 20, 2010; International Application No. PCT/US2009/057825 filed Sep. 22, 2009.

Minnick, Danny Jean et al., "Graphical Interface Navigation Based on Image Element Proximity," U.S. Appl. No. 12/609,860, filed Oct. 30, 2009.

White, James Matthew et al. "Systems and Methods for Configuration of a Remote Control Device," U.S. Appl. No. 12/241,550, filed Sep. 30, 2008.

White, James Matthew et al. "Systems and Methods for Graphical control of User Interface Features Provided by a Television Receiver," U.S. Appl. No. 12/241,556, filed Sep. 30, 2008.

VanDuyn, Luke et al. "Systems and Methods for Graphical Control of Picture-In-Picture Windows," U.S. Appl. No. 12/241,571, filed Sep. 30, 2008.

White, James Matthew et al. "Systems and Methods for Providing Customer Service Features Via a Graphical User Interface in a Television Receiver," U.S. Appl. No. 12/241,580, filed Sep. 30, 2008.

Martch, Henry Gregg "Systems and Methods for Automatic Configuration of a Remote Control Device," U.S. Appl. No. 12/242,089, filed Sep. 30, 2008.

White, James Matthew et al. "Systems and Methods for Graphical Control of User Interface Features in a Television Receiver," U.S. Appl. No. 12/241,599, filed Sep. 30, 2008.

Coburn, Matthew et al. "Systems and Methods for Graphical Control of Symbol-Based Features in a Television Receiver," U.S. Appl. No. 12/241,604, filed Sep. 30, 2008.

White, James Matthew et al. "Systems and Methods for Graphical Adjustment of an Electronic Program Guide," U.S. Appl. No. 12/241,608, filed Sep. 30, 2008.

VanDuyn, Luke et al. "Methods and Apparatus for Presenting Supplemental Information in an Electronic Programming Guide," U.S. Appl. No. 12/235,476, filed Sep. 22, 2008.

VanDuyn, Luke et al. "Methods and Apparatus for Providing Multiple Channel Recall on a Television Receiver," U.S. Appl. No. 12/242,587, filed Sep. 30, 2008.

Taxier, Karen Michelle et al. "Methods and Apparatus for Visually Displaying Recording Timer Information," U.S. Appl. No. 12/235,464, filed Sep. 22, 2008.

Martch, Henry Gregg et al. "Methods and Apparatus for Locating Content in an Electronic Programming Guide," U.S. Appl. No. 12/242,614, filed Oct. 17, 2008.

International Searching Authority, European Patent Office, "International Search Report," mailed Feb. 4, 2010; International Application No. PCT/US2009/058937, filed Sep. 30, 2009.

International Searching Authority, European Patent Office, "International Search Report," mailed Feb. 16, 2010; International Application No. PCT/US2009/057582, filed Sep. 18, 2009.

Wightman, Robert Edward "Methods and Apparatus for Providing Multiple Channel Recall on a Television Receiver," U.S. Appl. No. 12/233,274, filed Sep. 18, 2008.

USPTO "Non-Final Office Action" mailed Nov. 24, 2010; U.S. Appl. No. 12/242,587, filed Sep. 30, 2008.

USPTO "Non-Final Office Action" mailed Jan. 12, 2011; U.S. Appl. No. 12/241,580, filed Sep. 30, 2008.

USPTO "Non-Final Office Action" mailed Feb. 9, 2011; U.S. Appl. No. 12/241,608, filed Sep. 30, 2008.

USPTO "Non-Final office Action" mailed Feb. 4, 2011; U.S. Appl. No. 12/241,599, filed Sep. 30, 2008.

* cited by examiner 1  2  3

4  5  6

7  8  9

APPARATUS AND METHODS FOR DYNAMIC PICTORIAL IMAGE AUTHENTICATION

RELATED APPLICATIONS

This application claims the benefit of U.S. Provisional Application No. 61/074,966, entitled "APPARATUS AND METHODS FOR DYNAMIC PICTORIAL IMAGE AUTHENTICATION", filed on Jun. 23, 2008, which is hereby incorporated by reference in its entirety.

BACKGROUND

In computer systems, access to particular features, data, physical locations and the like is often protected through a password authentication process. A user enters a password through a user interface, and the computer system verifies the user's password prior to allowing the user access to a secured item. Typically, a password is comprised of a combination of alphanumeric characters inputted to the computer system through a keyboard, keypad, touch screen, mouse or the like. In this type of authentication system, there are a variety of ways for another person to obtain knowledge of the user's password, potentially compromising the authentication process. For example, an onlooker may see the particular keys that the user utilizes to enter their password, thus, obtaining access to the user's password.

This problem is further exacerbated through systems that lack dedicated keyboards, keypads and the like. For example, a touch pad television remote control or other input device may not include any numeric buttons, and thus, a user may enter data through a virtual keyboard or keypad displayed on the television screen. In other words, the television screen presents a virtual keyboard, and the user utilizes the touch pad to manipulate a cursor, inputting data by actuating the cursor upon selected keys of the virtual keyboard. However, this type of data entry technique is problematic for inputting passwords and other sensitive data, because any person within line of sight of the television screen may see the keys of the virtual keyboard actuated by the user, thus obtaining access to the user's password.

BRIEF DESCRIPTION OF THE DRAWINGS

The same number represents the same element or same type of element in all drawings.

DETAILED DESCRIPTION

Figure 1:
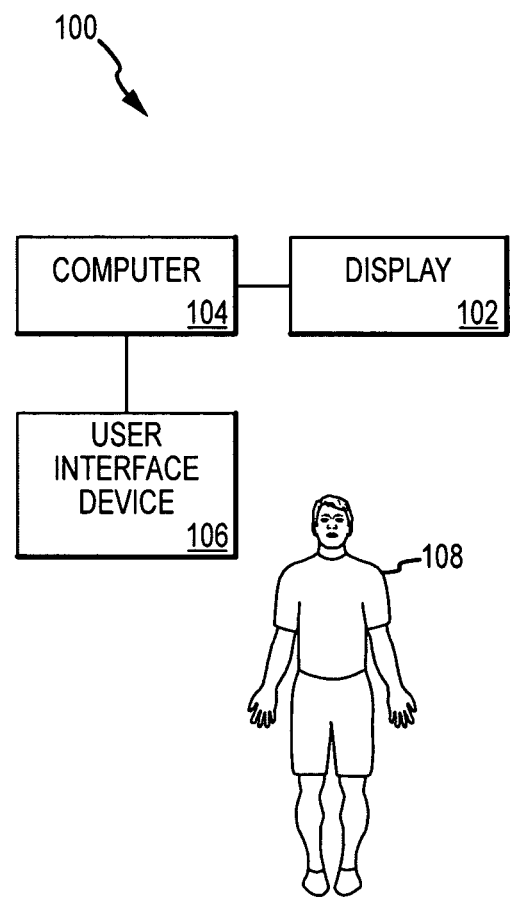
FIG. 1 illustrates an embodiment of a secured computing system.

The various embodiments described herein generally provide apparatus, systems and methods which facilitate user authentication in a computing system. More particularly, the various embodiments described herein comprise systems, methods and apparatus for authenticating users based on pictorial discernment of images displayed to the user. Multiple images are displayed to a user, with each image having one or more distinguishing characteristics. Each symbol of the user's password is associated with a particular characteristic included in one of the displayed images. The user is properly authenticated if they select the images having the characteristics corresponding with the symbols of their password.

The user's password may be comprised of multiple symbols, each symbol corresponding with a different characteristic of the images. In at least one embodiment, the user is presented with a grid of images to input a symbol of the password. The images may each include multiple distinguishing features. For example, the image corresponding with the symbol of the user's password may include multiple features which are not found in any of the other images in the grid. The user selects the image including the distinguishing feature that corresponds with the symbol of the password. The input process may be repeated for multiple symbols until the user has entered each symbol of their password. If the user selects the correct image for each symbol of the password, then they are authenticated by the computing system and granted access to the secured item. Similarly, an incorrect selection of one or more of the images may result in a failure of the authentication process, and thus, the user may be denied access to the secured item.

In at least one embodiment, the images may be comprised of a base object, with each image augmented by one or more distinguishing features. In other words, the images may be comprised of an object having the same form factor and various interchangeable parts. For example, the images may be comprised of monsters each having the same or substantially the same body. Each image may further include distinctive eyes, feet, antenna, hair/hats, mouths, accessories or the like. Various distinct combinations of images may be presented to the user each time they attempt the authentication process. In other words, the actual image corresponding with the user's password symbol may change between login attempts. However, the user still selects the image having the distinguishing feature each time they login.

For example, the distinguishing feature corresponding with the first symbol of the user's password may be a Mohawk on a monster. During a first login attempt, the Mohawk feature may be combined with bug eyes and webbed feet to generate an image of a monster for presentation to the user. During a subsequent login attempt, the Mohawk may be combined with three eyes and bird feet to generate a different image of a monster. Each time the image may look significantly different, but the user is able to select the proper image by remembering that the symbol of their password corresponds with an image including a Mohawk. Because the overall appearance of the image corresponding with the password symbol changes during each login attempt, a person watching the user login may not know why the user is picking a particular image. For example, in the first login attempt, an onlooker may not be sure whether the user selected the image because of the Mohawk, the bug eyes or the webbed feet.

In at least one embodiment, each feature acts as a character within an alphabet used by the computing system to authenticate the user. The user is not authenticated to the system unless they select the proper sequence of characters corresponding to their password. It is to be appreciated that increasing the number of distinguishing features of the images increases the size of the alphabet, and correspondingly decreases the likelihood of the user's password becoming compromised. In at least one embodiment, each distinguishing feature may be used once within a grid of images. For example, within a single displayed grid of monster images, only one monster may have a Mohawk. Likewise, within the same grid, only a single image may have webbed feet. In other embodiments, particular combinations of images may act as a symbol within the alphabet. For example, the combination of a Mohawk and webbed feet may correspond with one character of the alphabet, whereas the combination of a Mohawk and bird feet may correspond with another character in the alphabet.

As described above, the overall appearance of each image may change between each login attempt to decrease the chance of an onlooker correctly identifying the features corresponding with the symbols of the user's password. Further, in at least one embodiment, the various distinct combinations of images may be shuffled between input of each symbol of the password by the user within the same login attempt. For example, the user selects a particular image corresponding with the first symbol of their password. After receipt of the first input, the computing system shuffles the image combinations within the grid and presents the shuffled images to the user. The user then provides second input corresponding with the second symbol of their password. The process may be repeated for the number of symbols in the user's password. If the user enters the correct combination of symbols corresponding with a stored password, then the user is provided access to the secured item. Similarly, if the user does not enter the correct combination of symbols corresponding with a stored password, then the user is denied access to the secured item.

FIG. 1 illustrates an embodiment of a secured computing system 100. The computing system 100 is configured to restrict access by a user to a secured item. The secured item may be a feature of the computing system 100, data stored internally within the computing system 100 or externally with respect to the computing system 100, a physical location (e.g., a locked room) and the like. The computing system 100 includes a display 102, a computer 104 and a user interface device 106. Each of these components will be discussed in greater detail below. The computing system 100 may include other elements, devices or components not illustrated for the sake of brevity.

The computer 104 is operable to control access by the user 108 to a secured item. As used herein, the computer 104 comprises any type of device operable to control access by the user 108 to a secured item. For example, the computer 104 may comprise a personal computer, a server, a security system (e.g., a door or gate access system), a television receiver (e.g., a satellite or cable television set-top box), a digital-video-recorder (DVR), a video-game-console, an automatic teller machine (ATM) and the like. In other words, the computer 104 may comprise any type of electronic device, general purpose computing device or special purpose computing device that includes a processor, other circuitry or logic operable to perform the pictorial authentication processes described herein to control access to a secured item.

The secured item may comprise any type of data, software feature, hardware feature, physical device or the like that has controlled access based on authentication of the user 108. In at least one embodiment, the secured item comprises access to the computer 104. In other words, the user 108 may be required to input a password in order to login and utilize the software of the computer 104. Password authentication processes are utilized to control access to many types of operating systems, such as the MICROSOFT WINDOWS operating system. The secured item may also comprise access to a more limited set of software applications on the computer 104. For example, the user 108 may provide authentication information to access an e-mail program on the computer 104. In other embodiments, the secured item may be data on the computer that has limited access based on proper authentication of the user 108. In at least one embodiment, the secured item may be a hardware feature or component of the computer. For example, the user 108 may provide authentication information to access an input and/or output port of the computer 104.

The computer 104 is operable to output a video signal for presentation by the display 102. The display 102 may comprise any type of display device capable of receiving and outputting a video signal in any format. Exemplary embodiments of the display 102 include a computer monitor, television, liquid crystal display (LCD) display screen, touch screen and projector. The display 102 and the computer 104 may be communicatively coupled through any type of wired or wireless interface. For example, the display 102 may be communicatively coupled to the computer 104 through a coaxial cable, component or composite video cables, an HDMI cable, a VGA or SVGA cable, a Bluetooth or WiFi wireless connection or the like. In at least one embodiment, the display 102 and the computer 104 are integrated into a single unit. For example, a laptop comprises an integrated display 102 and computer 104.

More particularly, the display 102 is at least operable to present one or more user authentication screens to the user 108. For example, the computer 104 may output a video signal including an authentication menu comprising a grid of images each having distinguishing features. The display 102 receives the video signal and outputs the authentication menu to the user 108. If the authentication menu controls access to features and/or data of the computer, then the display 102 may be further operable to output video signals associated with the features and/or data of the computer 104 if the user 108 is properly authenticated.

The user interface device 106 is operable to receive input from the user 108 and provide the input to the computer 104. More particularly, the user interface device 106 is operable to receive input representing characters/symbols of the user's 108 password. The user interface device 106 may comprise any type of man-machine interface. Exemplary user interface devices 106 include keyboards, keypads, mice, touch screens, video game controllers, microphones, mobile telephones, personal digital assistants (PDAs) and television or multimedia device remote controls. In other words, the user 108 may use any type of data input device to select one or more images corresponding with the symbols of their password.

To enter each symbol of their password, the user 108 selects the corresponding image displayed on-screen that corresponds with their password. In at least one embodiment, the user 108 provides numeric or text input, i.e., enter letters, numbers or other symbols to select the image. For example, each image may have a corresponding number or letter that the user 108 enters via a keyboard, keypad or the like of the user interface device 106 to select the image as corresponding with the symbol of their password. In some embodiment, the computer 104 may comprise a server accessible over the internet, and the user interface device 106 may comprise a client terminal communicatively coupled to the server. The authentication techniques described herein may be performed to authenticate the user 108 to the server.

In at least one embodiment, the user 108 may utilize the user interface device 106 to manipulate a cursor to select one of the images displayed on screen. For example, a television remote control may include a touch pad that manipulates a cursor to select an image presented on-screen. The use of other positional input devices, such as mice may also be utilized to manipulate a cursor to select images presented on-screen. In at least one embodiment, the user interface device 106 may be integrated with the display 102, e.g., a touch screen, and the user 108 may select the region of the touch screen corresponding with a selected image to provide input to the computer 104.

Figure 2:
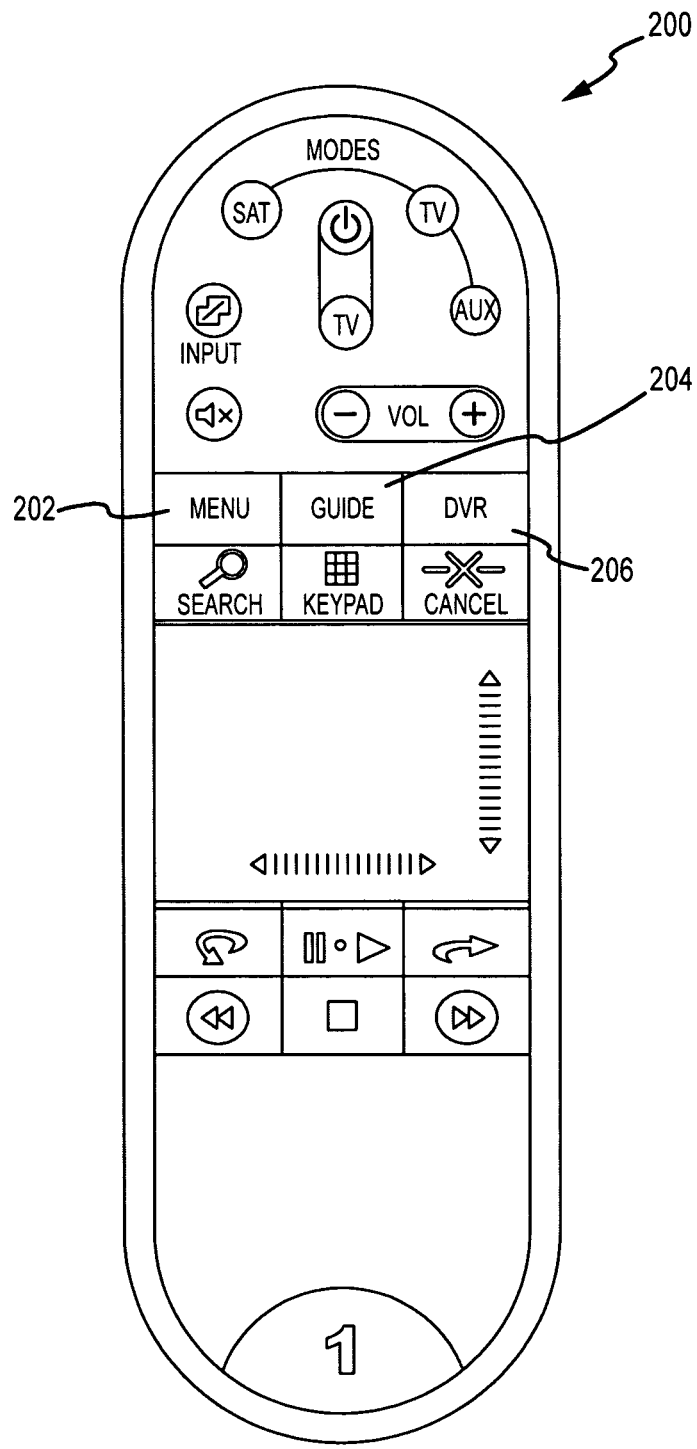
FIG. 2 illustrates an embodiment of a television remote control that includes no numeric keypad.

In some embodiments, particular buttons of the user interface device 106 may correspond with particular images displayed on screen. FIG. 2 illustrates an embodiment of a television remote control 200 that includes no numeric keypad. Particular buttons, such as menu, guide, DVR, search, keypad, cancel, reverse, stop, forward, pause, jump back, jump forward and the like may be mapped to particular images illustrated on-screen in an authentication menu. For example, the authentication menu may include a 3×3 grid of images, numbered 1-9. A first image in the grid may be selected be actuating the menu button 202. Similarly, a second image in the grid may be selected by actuating the guide button 204, and third image in the grid may be selected by actuating the DVR button 206. Thus, a user may select particular images on screen without the need for on-screen manipulation of a selection cursor. In at least one embodiment, an image of the remote control 200 may be presented on-screen, e.g., adjacent to the grid of images, to display the mapping of the images in the grid to particular keys. Similarly, the image grid may be overlaid on an image of the remote control 200, allowing the user to visually see the mapping of images to particular keys of the remote control 200.

Returning to FIG. 1, the computer 104 processes the user input to determine whether the user 108 has provided correct authentication information. If the user 108 selects an image having a distinguishing feature corresponding with a symbol of their password, then the computer 104 determines that the symbol of the password was correctly inputted by the user 108. Likewise, if the user 108 selects an image that does not include the distinguishing feature corresponding with the symbol of their password, then the computer 104 determines that the symbol of the password was correctly inputted by the user 108.

As described above, the computer 104 and display 102 may cooperate to present a grid of images to the user 108 during the authentication process. Each image may include one or more distinguishing features, with the distinguishing features corresponding with symbols of an alphabet utilized by the computer 104 during the authentication process. The distinguishing features may be shuffled between the input of particular symbols of the password, during login attempts or any combination thereof.

The alphabet may be comprised of any type of image feature that may be recognized by the user 108 as corresponding with symbols of their password. Different combinations of distinguishing features may be combined together in a single image so that an onlooker doesn't know why the user 108 selected a particular image. In at least one embodiment, each distinguishing feature may comprise a character of the alphabet. In other embodiments, some of the distinguishing features may be decoy features that are not part of the alphabet of possible password symbols.

For example, the authentication menu may comprise a three by three grid of images, with each image including at least two distinguishing features. Thus, there are a total of 18 distinguishing features included within the nine images displayed on screen at any time. In the example below, the distinguishing features may be combined in any combination. Table 1 illustrates a first embodiment of a grid of images displayed by the display 102.

TABLE #1

| Image | Distinguishing Features |
|---|---|
| 1 | 1, 2 |
| 2 | 3, 4 |
| 3 | 5, 6 |
| 4 | 7, 8 |
| 5 | 9, 10 |
| 6 | 11, 12 |
| 7 | 13, 14 |
| 8 | 15, 16 |
| 9 | 17, 18 |

In the described example, the user's 108 password is comprised of four symbols. The first symbol is associated with distinguishing feature #1. The second symbol may be associated with distinguishing feature #9. The third feature is associated with distinguishing feature #13 and the fourth symbol is associated with distinguishing feature #6. To enter their password, the user 108 selects images 1, 5, 7 and 3 in that particular sequence. If the correct sequence of images is selected, then the user 108 is properly authenticated by the computer 104 and granted access to the secured item.

In the described example, an onlooker does not know whether the user 108 selected a particular image for its first distinguishing feature or its second distinguishing feature. For example, when the user 108 selects image #1 for the first symbol of the password, the onlooker doesn't know whether the user's 108 password symbol corresponds with distinguishing feature #1 or distinguishing feature #2. In at least one embodiment, the combinations of distinguishing features may be shuffled between login attempts to generate different images. In at least one embodiment, the distinguishing features may be shuffled randomly. In other embodiments, the distinguishing features may be shuffled according to a pre-determined order or pre-determined combinations. Table 2 illustrates a second embodiment of a grid of images presented by the display 102 during a subsequent login attempt.

TABLE #2

| Image | Distinguishing Features |
|---|---|
| 1 | 7, 10 |
| 2 | 18, 2 |
| 3 | 9, 5 |
| 4 | 3, 1 |
| 5 | 4, 11 |
| 6 | 6, 16 |
| 7 | 12, 15 |
| 8 | 8, 14 |
| 9 | 13, 17 |

In this embodiment, the user 108 selects images 4, 3, 9 and 6, respectively to input their password. Because the combinations of distinguishing features shuffle during each login attempt, an onlooker is less likely to determine why the user 108 selects an image for each symbol of their password. To further increase the security of the computing system 100, the combinations of distinguishing features may be shuffled between the input of each symbol of the password by the user 108. In other words, the user 108 enters the first symbol of their password, and the computer 104 displays a different set of images in the grid before receiving input corresponding with the second symbol of their password. Table 3 illustrates a table illustrating the combinations of distinguishing features displayed in the grid of images during receipt of input for each image of the user's 108 password.

TABLE #3

| Image | Distinguishing Features | | | |
|---|---|---|---|---|
| | Symbol #1 | Symbol #2 | Symbol #3 | Symbol #4 |
| 1 | 11, 18 | 2, 5 | 3, 9 | 10, 11 |
| 2 | 1, 15 | 6, 7 | 10, 17 | 3, 8 |
| 3 | 2, 3 | 8, 18 | 4, 16 | 9, 16 |
| 4 | 7, 12 | 11, 13 | 8, 7 | 6, 18 |
| 5 | 6, 13 | 3, 15 | 1, 2 | 7, 17 |
| 6 | 9, 10 | 4, 10 | 5, 18 | 1, 6 |
| 7 | 4, 17 | 1, 9 | 6, 11 | 2, 15 |
| 8 | 5, 8 | 14, 17 | 12, 13 | 4, 14 |
| 9 | 14, 16 | 16, 12 | 14, 15 | 12, 13 |

In the described example, the user 108 selects image 2 for symbol #1, image 7 for symbol #2, image 8 for symbol #3 and image 4 for symbol #4. Because the images shuffle each time, it is less likely that an onlooker will determine why the user 108 picks particular images for input of each symbol. Further, if the images shuffle immediately after input for a particular symbol, then an onlooker may not have enough time to view and remember the particular distinguishing features for a particular image. Thus, it is less likely that a user's password will become compromised during the described authentication technique.

There is a tradeoff between the distinctiveness of particular features in the images and the ability of the user 108 to remember their password. If the features are too distinctive, then it may become possible for an onlooker to determine the features corresponding with the user's password. For example, if a feature corresponding with a symbol of the user's 108 password comprises a convertible car, and the other distinguishing features comprise animals, then the car may look out of place, and an onlooker may notice a pattern after the user 108 performs several login attempts.

This problem may be mitigated by utilizing similar types of distinguishing features. For example, different combinations of animals may be used as distinguishing features in one set of images. In one set of images, a Doberman may be paired with a tiger in one image of a first instance of the image grid, whereas a Labrador may be paired with lion in another image in the grid. During shuffling, the Doberman may be paired with the lion in an image of a second instance of the grid, and similarly, the Labrador may be paired with the tiger in another image of the grid. Because the animal combinations are similar in type, each distinguishing feature may not stand out to the onlooker. At the same time, the user 108 is able to easily discern the image containing the distinguishing feature corresponding with the symbol of their password.

In at least one embodiment, the images may be comprised of a base object augmented with various distinguishing features. For example, the base object may comprise the body of a person, doll, animal, alien, monster, robot, other creature, automobile, plane, boat and the like. The images may be augmented with various interchangeable parts, such as eyes, ears, hair, hats, mouths, noses, arms, legs, facial hair, jewelry and other accessories. Thus, by changing the various interchangeable parts within the images, a series of distinct images is created.

Figure 3:
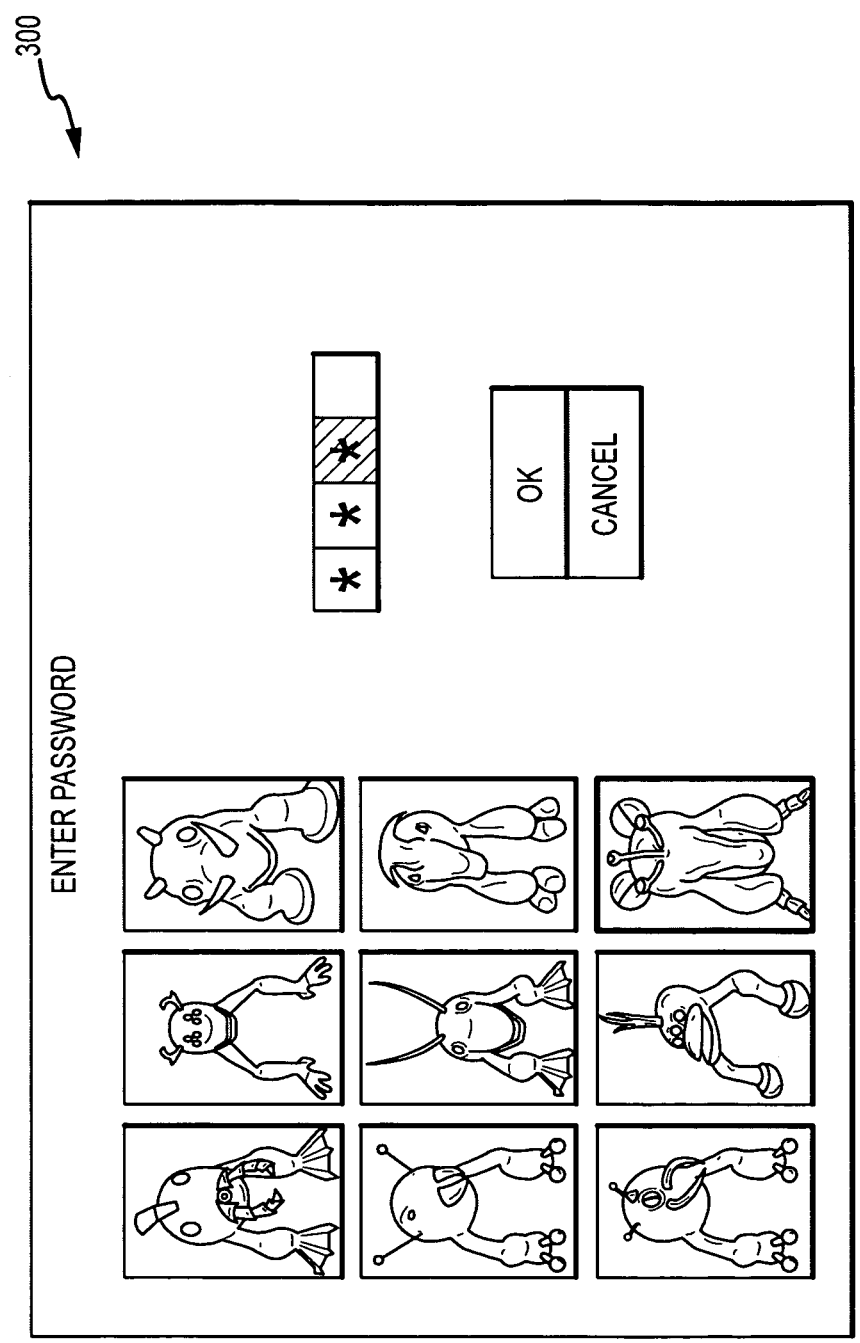
FIG. 3 illustrates an embodiment of a screenshot of aliens having similar shaped bodies and various interchangeable body parts.

FIG. 3 illustrates an embodiment of a screenshot 300 of aliens having similar shaped bodies and various interchangeable body parts. FIG. 3 will be discussed in reference to the computing system 100 described in FIG. 1. As illustrated in FIG. 3, the aliens have disparate antenna/hair, mouths, eyes, noses, legs and feet. These disparate interchangeable parts create an array of distinctive images. Further, each varying interchangeable part may correspond with a character of an alphabet utilized by the computer 104.

For example, the alien in the upper left corner of the grid has a Mohawk, segmented claws and bug eyes. Each of these distinguishing features may correspond with a character of the alphabet utilized by the computer 100. Similarly, the alien in the image to the immediate right includes six eyes, frog legs, a frog mouth and an L-shaped antenna. Similarly, each of these distinguishing features may correspond with a character of the alphabet utilized by the computer 104.

Each symbol of the user's 108 password corresponds with one of the illustrated distinguishing features. For example, if the first symbol of the password was associated with a Mohawk, then the user 108 would select the image in the upper left corner of the grid to input the first symbol. The process may be repeated for N number of symbols, where N is the number of symbols in the password.

The user 108 may select a particular image through a variety of input mechanisms. In at least one embodiment, the display 102 and the user input device 106 may comprise an integrated touch screen display, and the user 108 may select an image by touching a particular region of the display 102. For example, the user 108 may select the image in the bottom right corner of the gird to correspond with the fourth symbol of their password. As the user 108 selects a particular image, the computer 104 may highlight the image, as illustrated in screenshot 300. In at least one embodiment, an automated teller machine (ATM) with touch screen technology may utilize the authentication process described herein. In some embodiments, the display 102, the computer 104 and the user interface device 106 may be integrated into a touch screen security device controlling access to a door, gate, security system or the like.

In another embodiment, the user 108 may select an image within the screenshot by manipulating a cursor using the user interface device 106. For example, the user interface device 106 may comprise a television remote control that includes a touch pad. The user 108 moves their finger along the touch pad to manipulate the cursor to a particular image within the grid. As the computer 104 receives input from the user interface device 106, the computer updates the display to move the location of the cursor. After the user 108 highlights the correct image, they may select the image by actuating a button or trigger on the remote control. In some embodiments, a user 108 may click or press the touch pad to initiate the image selection process.

Figure 4:
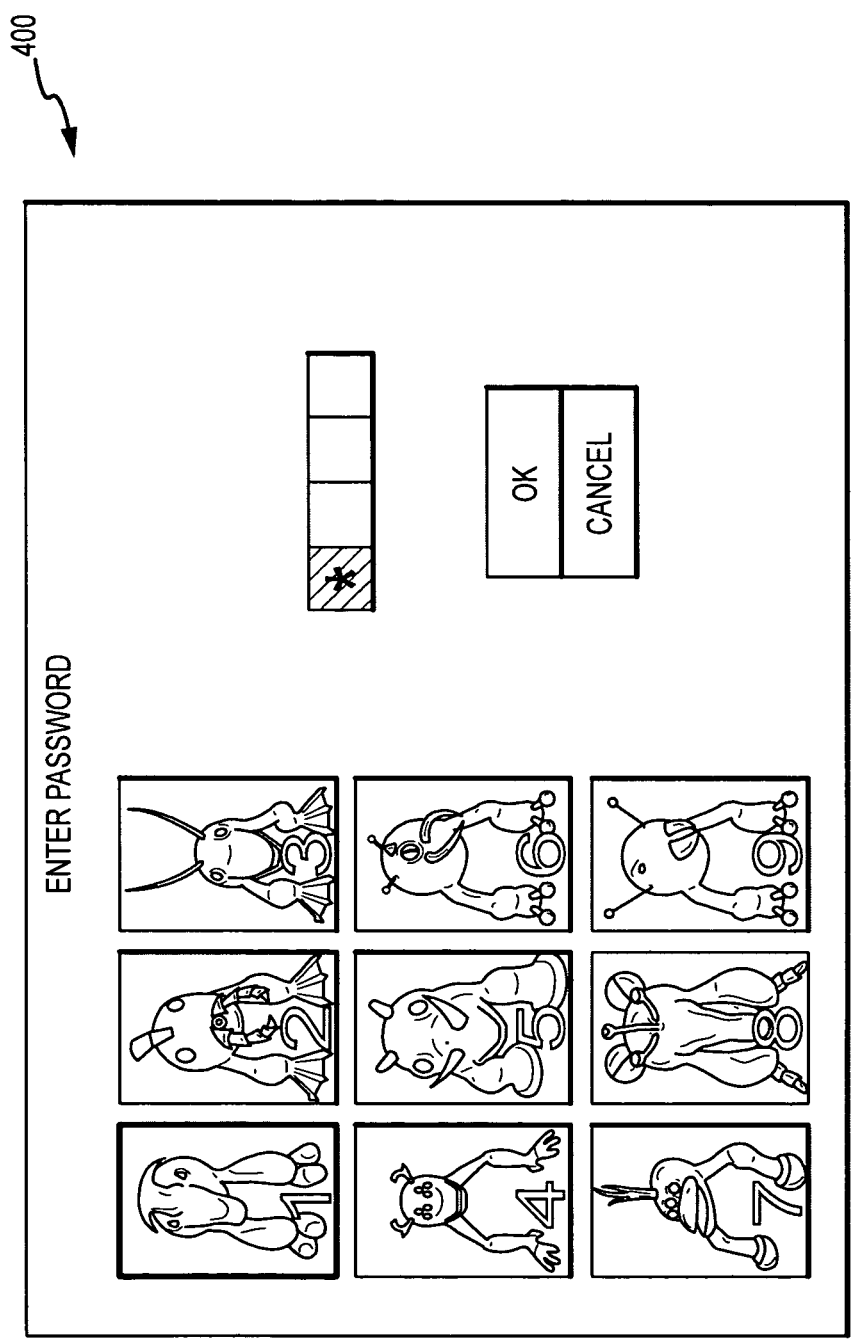
FIG. 4 illustrates an embodiment of a screenshot of aliens having similar shaped bodies, various interchangeable body parts and identifying information integrated into the images of the screenshot.

In other embodiments, each image may include associated textual characters utilized to identify the image. Thus, a user 108 may provide alphanumeric input to select a particular image. FIG. 4 illustrates an embodiment of a screenshot 400 of aliens having similar shaped bodies, various interchangeable body parts and identifying information integrated into the images of the screenshot. FIG. 4 will be discussed in reference to computing system 100 of FIG. 1.

FIG. 4 includes similar shaped aliens as illustrated in FIG. 3. Further, each image has an associated numeric identifier. A user 108 may utilize a keyboard, keypad or the like to input information identifying the selection of a particular menu. For example, the user interface device 106 may comprise a television remote control. Further, the second symbol of the user's 108 password may be associated with the fifth image in the grid. To input their selection, the user 108 may use the numeric keypad of the remote control to press the "5" key, selecting the fifth image in the grid. In some embodiments, the identifier information may comprise letters or other symbols typically available on a keyboard or keypad (e.g., the # or * keys).

In at least one embodiment, each distinguishing feature may be associated with a single character of the alphabet. Thus, in some embodiments, each distinguishing feature may be contained within a single image of the set of images. For example, a Mohawk may be associated with one character of an alphabet, whereas the segmented claw mouth may be associated with a second character of the alphabet. Thus, a selection of the second image of screenshot 400 may select two or more different characters of the alphabet. Because the second image has multiple distinguishing features, an onlooker may not be aware of why the user 108 has selected that particular image. Further, the next time the user 108 attempts to login, the Mohawk and segmented claw mouth may be included in disparate images, and thus, an onlooker will not know which image to select.

In some embodiments, different combinations of distinctive features may be associated with particular characters of the alphabet. For example, as illustrated in screenshot 400, multiple images include webbed feet. Each alien with webbed feet has different combinations of antenna/hair, mouths and eyes. Thus, the combination of a Mohawk and webbed feet may be associated with one particular character of an alphabet, whereas the combination of webbed feet and an antenna may be associated with another particular character of the alphabet. Further, the other distinguishing features of the images, such as the eyes and mouths, may be shuffled during each login attempt such that differing sets of images are presented to the user 108.

The distinguishing features or characteristics of the user's 108 password may be pre-assigned or may be selected by the user. For example, the user 108 may be presented with one or more menus that allow the user to select the symbols of their password. In at least one embodiment, the base object comprises the head of a man, and each of the distinguishing features comprises head pieces (e.g., hats or hair), eyes, mouth and noses of the man.

Figure 5:
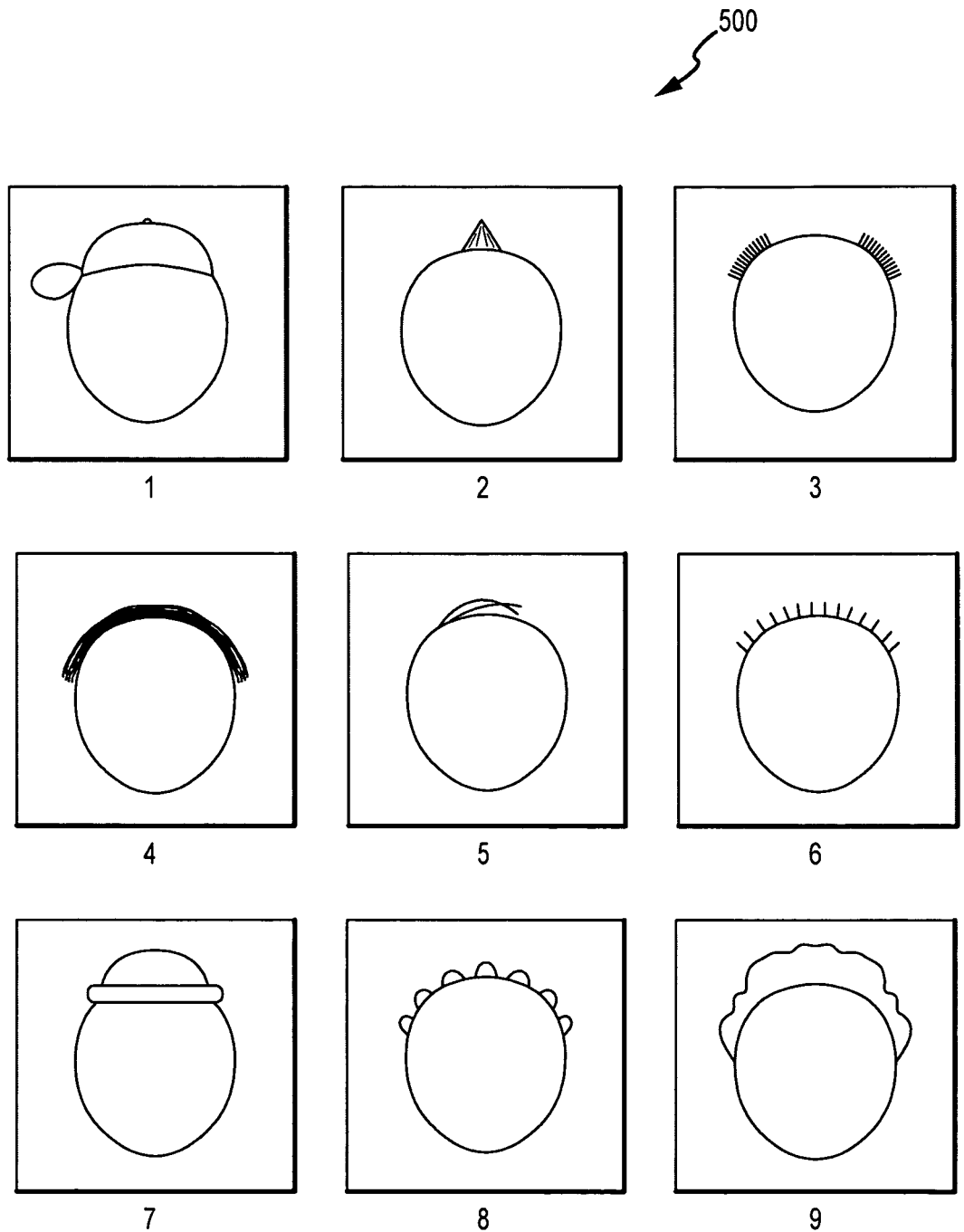
FIGS. 5-8 illustrate embodiments of selection menu screenshots.

FIG. 5 illustrates an embodiment of a selection menu screenshot 500. FIGS. 5-9 will be described in reference to the computing system 100 of FIG. 1. The computer 104 outputs the selection menu screenshot 500 for presentation by the display 102. The user 108 is presented with nine different head piece features, and selects one of the features as a first symbol of their password. For example, the user 108 may select image 1 to represent the first symbol of their password. Thus, an image with a baseball cap represents the first symbol of the user's 108 password.

Figure 6:
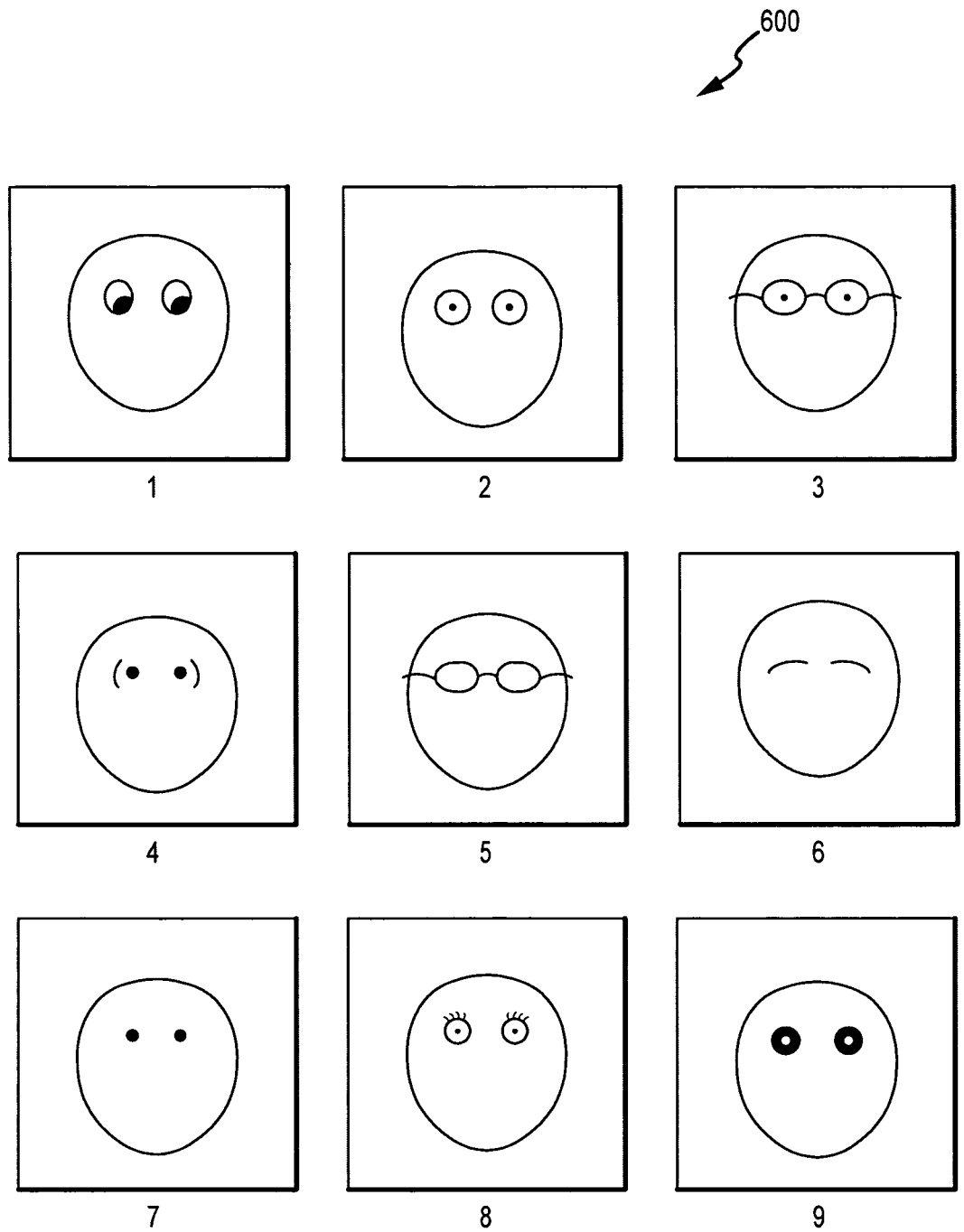

FIG. 6 illustrates an embodiment of another selection menu screenshot 600. In selection menu screenshot 600, the user 108 is presented with nine sets of eye features, and selects one of the features as a second symbol of their password. For example, the user 108 may select image 4 to represent the second symbol of their password.

Figure 7:
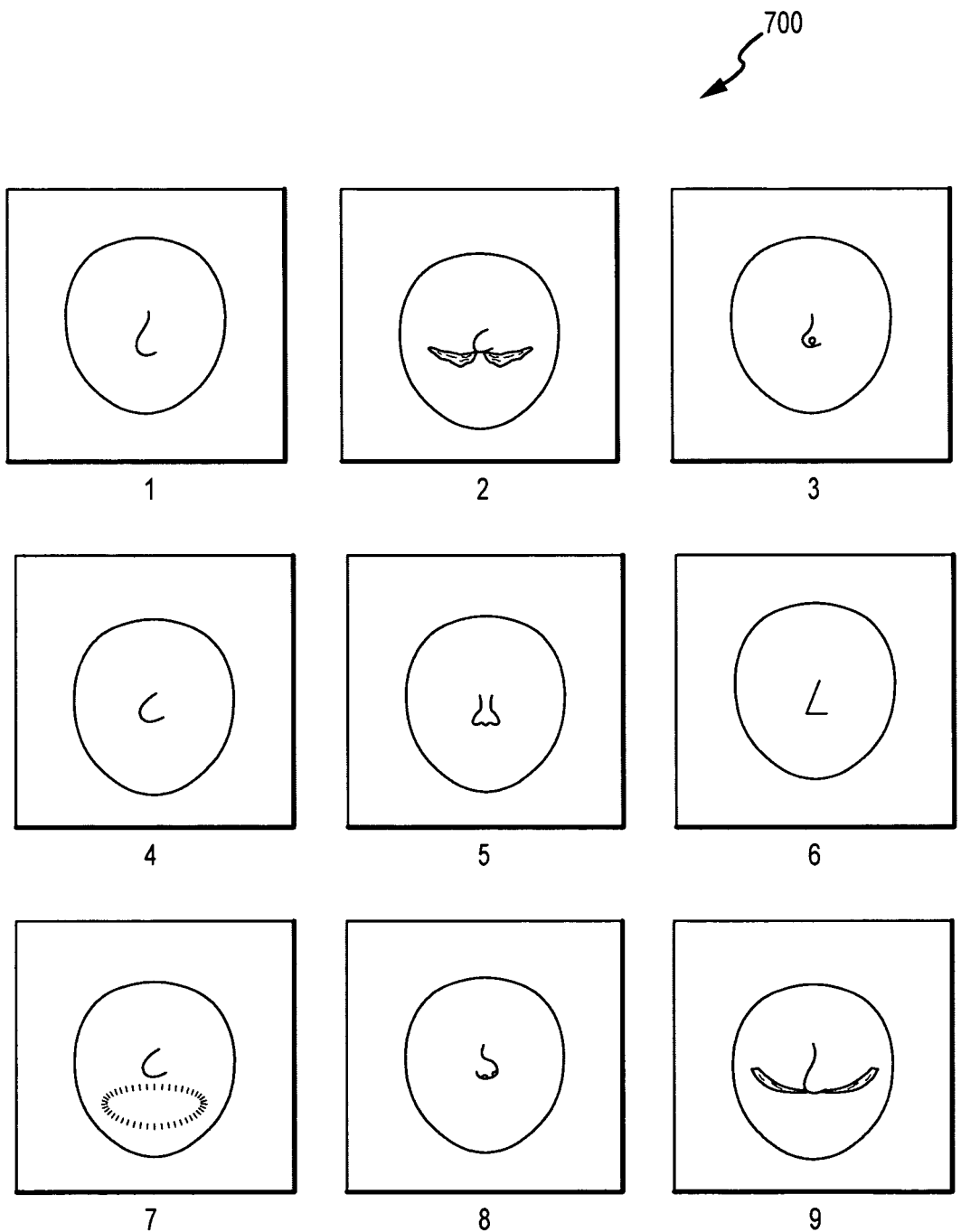

FIG. 7 illustrates another embodiment of a selection menu screenshot 700. In selection menu screenshot 700, the user 108 is presented with nine types of nose features, and selects one of the features as a third symbol of their password. For example, the user 108 may select image 2 to represent the third symbol of their password.

Figure 8:
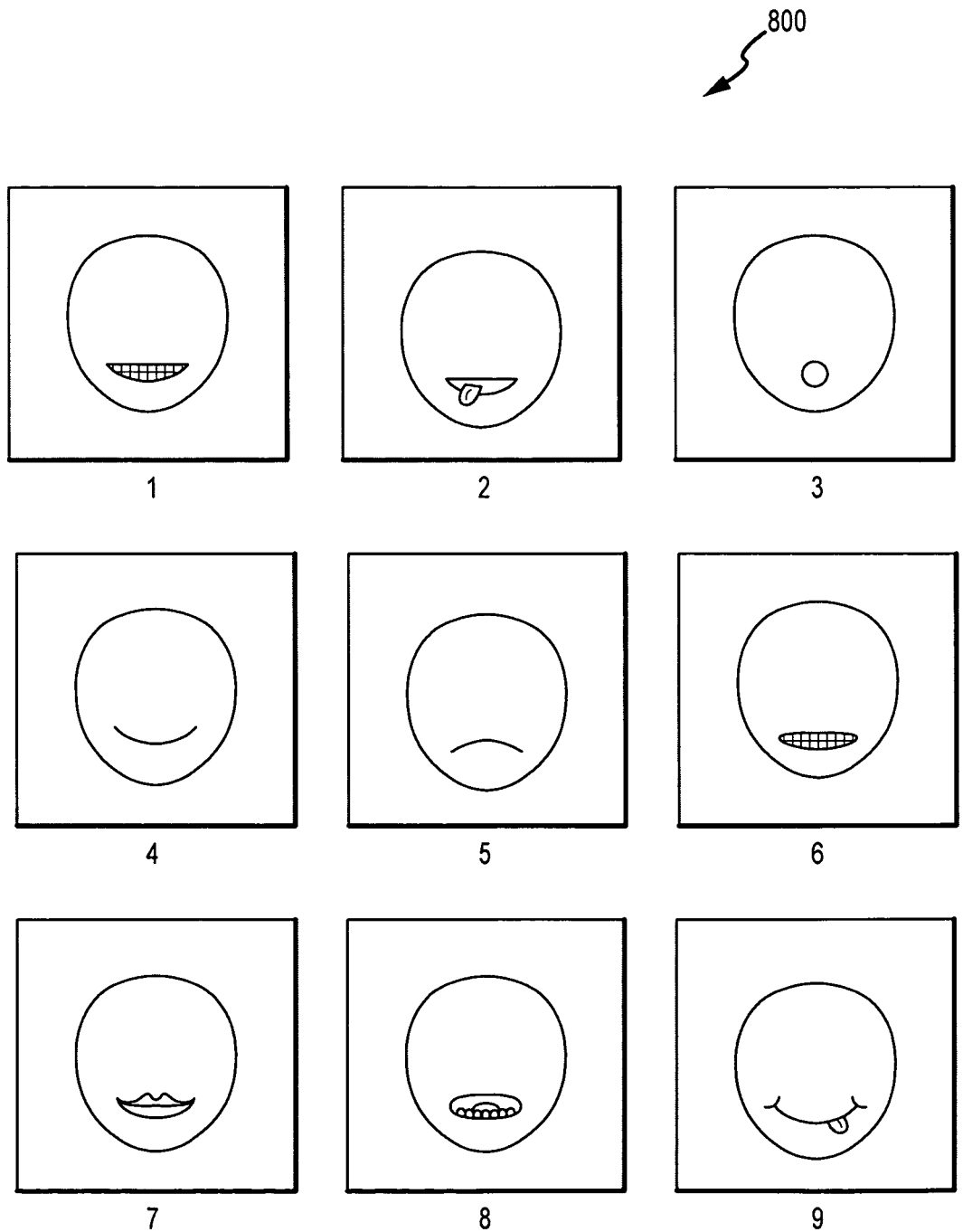

FIG. 8 illustrates another embodiment of a selection menu screenshot 800. In selection menu screenshot 800, the user 108 is presented with nine types of mouth features, and selects one of the features as a third symbol of their password. For example, the user 108 may select image 6 to represent the fourth symbol of their password.

Figure 9:
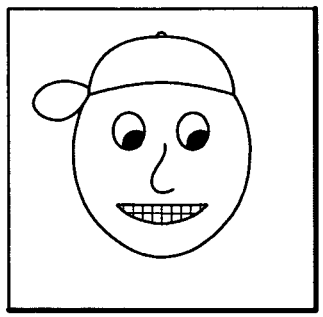
FIG. 9 illustrates an embodiment of a login menu screenshot.
Figure 9:
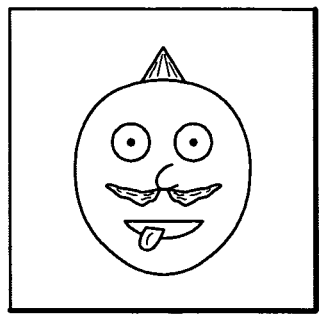
Figure 9:
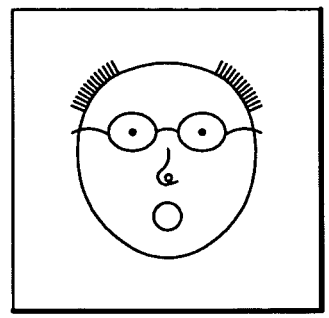
Figure 9:
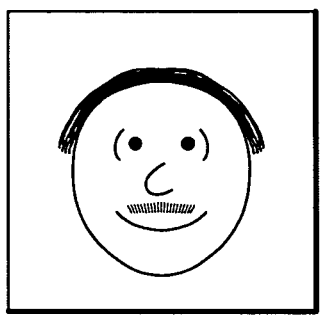
Figure 9:
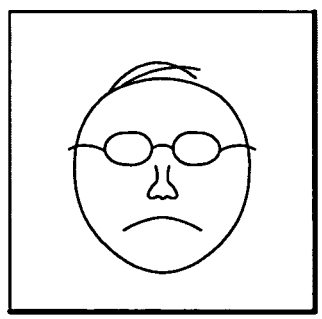
Figure 9:
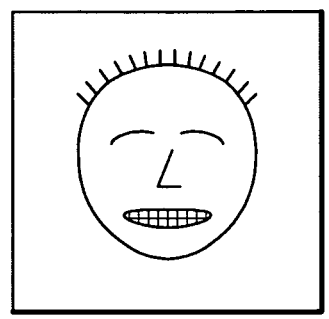
Figure 9:
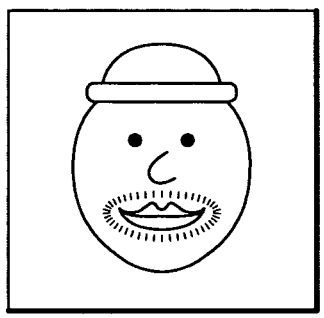
Figure 9:
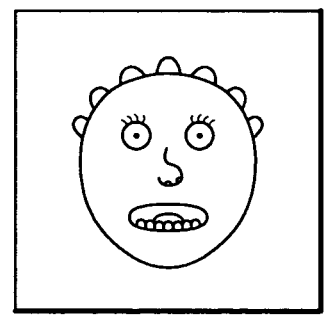
Figure 9:
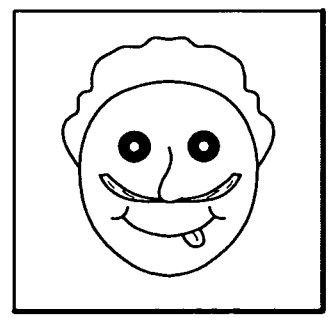

Each time the user 108 attempts to login to the computer 104, the display 102 presents the user 108 with a set of images containing various combinations of the distinguishing features illustrated in FIGS. 4-7. FIG. 9 illustrates an embodiment of a login menu screenshot 900. More particularly. FIG. 9 illustrates a screenshot 900 presented to a user for entering a first symbol of their password.

Referring to FIG. 9, each image in the screenshot 900 comprises a picture of a man that is comprised of various interchangeable body parts illustrated in FIGS. 4-7. As previously described, the first symbol of the user's 108 password corresponds with an image of a man that includes a baseball cap. Thus, the user 108 would select the first image to input the first symbol of their password.

Figure 10:
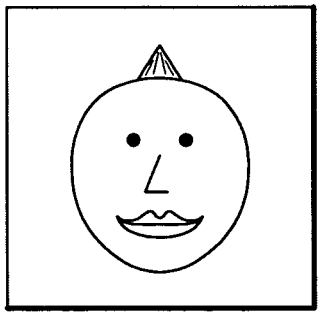
FIG. 10 illustrates another embodiment of a login menu screenshot.
Figure 10:
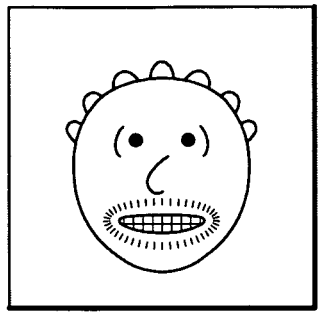
Figure 10:
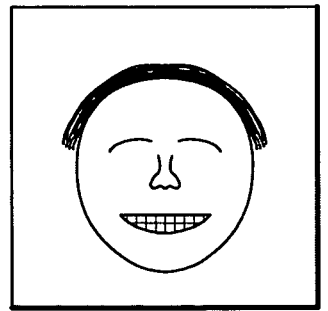
Figure 10:
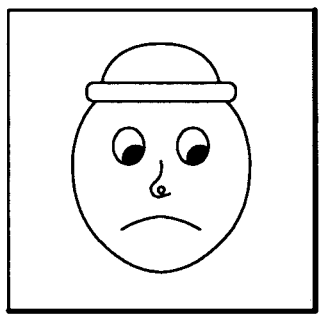
Figure 10:
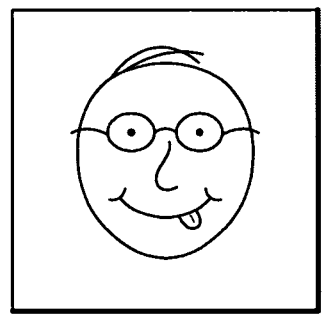
Figure 10:
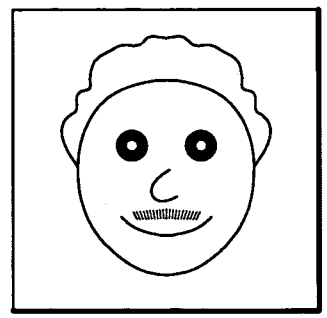
Figure 10:
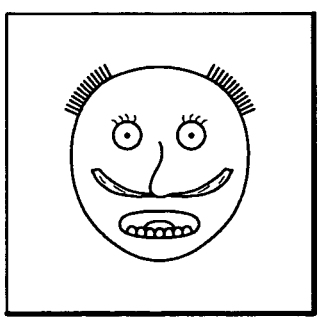
Figure 10:
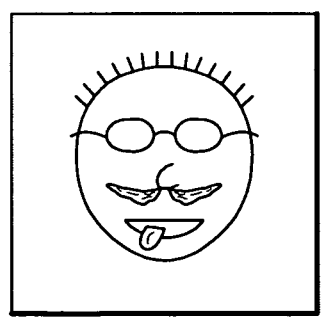
Figure 10:
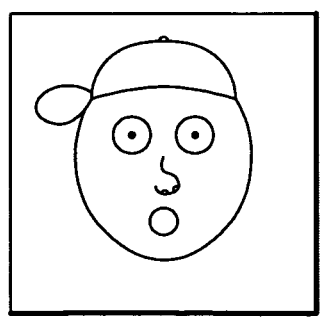

In at least one embodiment, the computer 104 then shuffles the composition of the images before receiving input corresponding with the second symbol of the user's 108 password. FIG. 10 illustrates another embodiment of a login menu screenshot 1000. The composition of the images of screenshot 900 is different than the composition of the images of screenshot 1000 because of the shuffling of the interchangeable body parts to generate different images. As previously described, the second symbol of the user's 108 password corresponds with an image that includes eyes comprised of a dot adjacent to a semi-circle. Thus, to input the second symbol of their password, a user 108 would select the second image of the screenshot 1000.

After the user selection of an image from screenshot 1000, the composition of the images may be shuffled again for the user 108 to input the third symbol of their password. The shuffling process may be repeated for each symbol of the user's 108 password. If the user 108 selects the correct corresponding image for each symbol of the password, then they are correctly authenticated to the computer 104 and are provided access to the secured item. Conversely, the computer 104 may deny the user 108 access to the secured item if an image is selected incorrectly.

Figure 11:
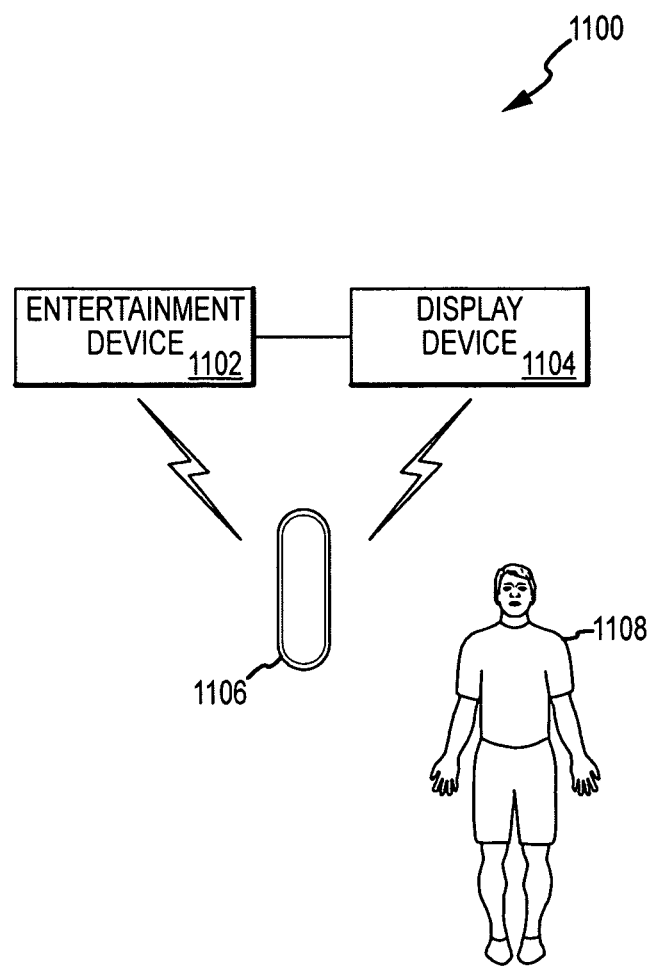
FIG. 11 illustrates an embodiment of an entertainment system.

As previously described, the computing system 100 may be embodied within an entertainment system. More particularly, the pictorial authentication processes described herein may be utilized to control access to particular features, channels, stored content or the like within the entertainment system. FIG. 11 illustrates an embodiment of an entertainment system 1100. The entertainment system 1100 presents content to a user 1108. In at least one embodiment, the content presented to the user 1108 includes a video stream, such as a television program, movie or other recorded content and the like. The entertainment system 1100 includes an entertainment device 1102, a display device 1104 and a remote control 1106. Each of these components is discussed in greater detail below. The entertainment system 1100 may include other devices, components or elements not illustrated for the sake of brevity.

The entertainment device 1102 is operable to receive content from one or more content sources (not shown in FIG. 11), and to present the received content to the user 1108 on the associated display device 1104. In at least one embodiment, the display device 1104 is a television configured to display content to the user 1108. The entertainment device 1102 may receive an audio/video stream in any format (e.g., analog or digital format), and output the audio/video stream for presentation by the display device 1104. The entertainment device 1102 may be further configured to display menus and other information that allow a user 1108 to control the output of content by the entertainment device 1102. In at least one embodiment, the entertainment device 1102 is a set-top box (e.g., a satellite or cable television converter box), digital video recorder (DVR) or other similar device that processes and provides one or more audio and/or video output streams to the display device 1104 for presentation to the user 1108. In some embodiments, the entertainment device 1102 and the display device 1104 may be integrated as a device combining the functionality of a display device and a set-top box, digital video recorder (DVR) or the like. In other embodiments, the entertainment device 1102 may comprise a media server, a digital-video-disk (DVD) player or other type of device operable to output content for presentation by a display device 1104.

The remote control 1106 may comprise any system or apparatus configured to remotely control the output of content by the entertainment device 1102. For example, the remote control 1106 may communicate commands to the entertainment device 1102 requesting to playback content, temporally move through content (e.g., fast-forward or reverse), adjust the volume, access electronic programming guides and the like. In some embodiments, the remote control 1106 may additionally be configured to remotely control the display device 1104. The remote control 1106 may communicate with the entertainment device 1102 and/or the display device 1104 through any type of wireless communication medium, such as infrared (IR) signals or radio-frequency (RF) signals.

The entertainment device 1102 is operable to control access to particular features and/or content accessible by the user 1108. For example, a secured feature of the entertainment device 1102 may comprise access to a channel of a satellite television broadcast system. The user 1108 utilizes the remote control 1106 to request access to the specified channel (e.g., by inputting a number of the channel). Because the access to the channel is controlled by the entertainment device 1102, the user 1108 provides authentication information (e.g., a password) to access the channel.

The entertainment device 1102 outputs an authentication menu for presentation by the display device 1104. In at least one embodiment, the authentication menu includes a plurality of images comprised of a base object and a series of interchangeable parts. For example, the authentication menu may look similar to the authentication screenshot 300 of FIG. 3. The user 1108 utilizes the remote control 1106 to select a first image corresponding with a first symbol of their password. The entertainment device 1102 is further operable to shuffle the composition of the images and receive selections corresponding with one or more symbols of the user's 1108 password.

If the user 1108 selects the correct images corresponding with their password, then the entertainment device 1102 begins outputting the locked channel for presentation by the display device 1104. Otherwise, the user 1108 is denied access to the locked channel. In at least one embodiment, the user 1108 may be provided with a subsequent attempt to enter their password again if the password is entered incorrectly during the authentication process.

In some embodiments, the remote control may include a touch pad for inputting information to the entertainment device 1102. The touch pad may be used in place of specific keys (e.g., a number pad) or may be used to augment the keys of a remote control. The touch pad may be utilized by the user 1108 to manipulate a cursor on screen to select a particular image presented within an authentication menu. In some embodiments, arrow keys (e.g., right, left, up and down) may be utilized to manipulate a cursor to select a desired image within the authentication menu.

Figure 12:
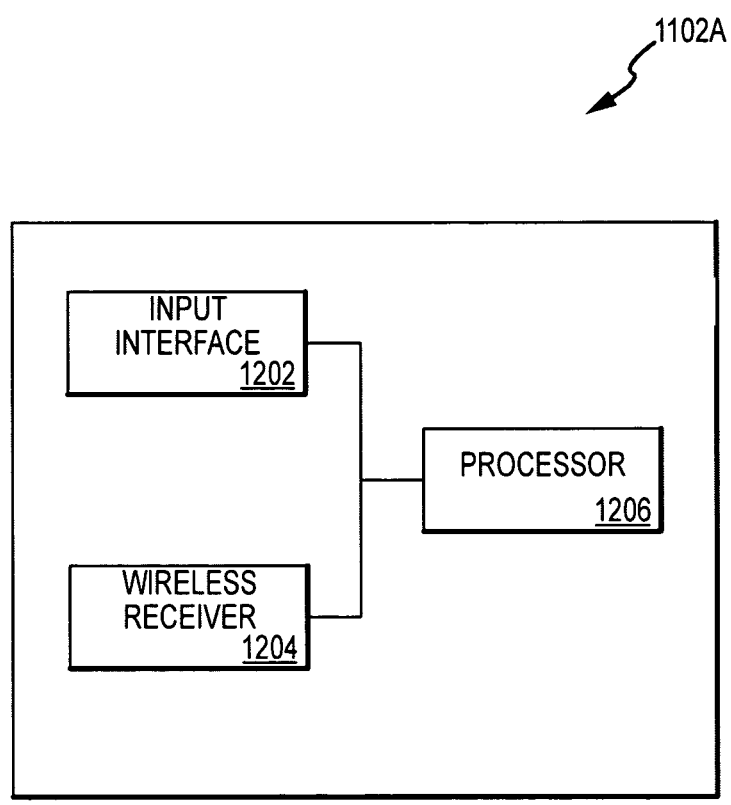
FIG. 12 illustrates an embodiment of an entertainment device of FIG. 11.

FIG. 12 illustrates an embodiment of an entertainment device of FIG. 11. More particularly, FIG. 12 illustrates an entertainment device 1102 embodied as a television receiver 1102A (e.g., a set-top box). However, it is to be appreciated that components of the television receiver 1102A may be utilized in other types of devices that output any type of presentation content. Still further, some components of FIG. 12 may be utilized within other types of computing devices, such as computers, servers, security systems, ATMs and the like. FIG. 12 will be discussed in reference to the entertainment system 1100 illustrated in FIG. 11. The television receiver 1102A includes an input interface 1202, a wireless receiver 1204 and a processor 1206. Each of these components will be discussed in greater detail below. The television receiver 1102A may include other components or devices not illustrated for the sake of brevity.

The input interface 1202 is operable for receiving presentation content, e.g., video content. The input interface 1202 may be operable for receiving and tuning any type of video content. For example, the input interface 1202 may receive an over-the-air broadcast signal, a direct broadcast satellite signal or a cable television signal. In at least one embodiment, the input interface 1202 may receive or retrieve content from a storage medium, such as an optical disk, internal or external hard drives, portable storage devices (e.g., universal serial bus (USB) memory sticks) and the like. The input interface 1202 may also receive content from external servers, such as video servers, that are communicatively coupled to the television receiver 1102A over the internet or other types of data networks.

The wireless receiver 1204 is operable to wirelessly receive arid/or transmit data to the remote control 1106 (see FIG. 11). The wireless receiver 1204 may communicate with the remote control 1106 utilizing any type of IR or RF communication link. In at least one embodiment, the wireless receiver 1204 receives a key code from the remote control 1106, and responsively provides the key code to the processor 1206. The wireless receiver 1204 is further operable to receive other data from the remote control 1106, such as positional information derived from a touch pad input device of the remote control 1106.

The processor 1206 is operable for controlling the operation of the television receiver 1102A. In at least one embodiment, the processor 1206 operates as an output interface that receives video content and responsively generates an output stream for presentation on a display device 1104. The processor 1206 is further operable to receive a key code and manipulate the output of the video content responsive to the key code. In other words, the processor 1206 operates responsive to the key code to control an output stream of video content.

The processor 1206 is further operable to control access to specific features and content of the television receiver 1102A. The processor 1206 controls access to the specific features and content by receiving password information from the user 1108. For example, the processor 1206 may output an authentication menu including a series of images, and solicit a selection of one of the images from the user 1108. One of the images corresponds with a particular symbol of the user's 1108 password. The images may then be shuffled and the input process repeated for each symbol of the user's 1108 password. The user 1108 is allowed access to the locked feature or content if they correctly select images corresponding with each symbol of the password.

It is to be appreciated that the various elements 1202 through 1206 may be may be combined into fewer discrete elements or may be broken up into a larger number of discrete functional elements as a matter of design choice. For example, the functionality of the input interface 1202 may be integrated into the processor 1206. Similarly, the functionality of the processor 1206 may be broken up into several discrete functional elements. For example, the control functionality of the processor 1206 may be separated from the output interface functionality of the processor 1206. Thus, the particular functional decomposition suggested by FIG. 12 is intended merely as exemplary of one possible functional decomposition of elements within the television receiver 1102A.

Figure 13:
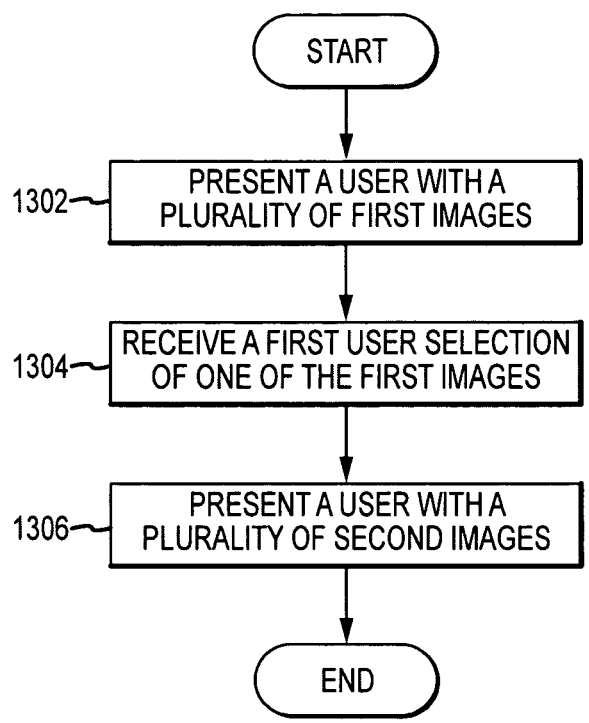
FIG. 13 illustrates an embodiment of a process for user selection of a pictorial password.

FIG. 13 illustrates an embodiment of a process for user selection of a pictorial password. A user selects a pictorial password for subsequent use when logging into a computing system. The method of FIG. 13 may include other operations not illustrated for the sake of brevity.

The process includes presenting a user with a plurality of first images (operation 1302). The first images may be presented within a selection menu displayed by a display device. In at least one embodiment, each first image is comprised of a base object and a first distinguishing feature. For example, each image may be comprised of a man's head, with each image having a different hairstyle/hat or the like.

The process further includes receiving a first user selection of one of the first images (operation 1304). The image associated with the first user selection corresponds with a first symbol of a password of the user. To make a selection, the user may manipulate a cursor using a touch pad, arrow keys or the like to select the desired image.

The process further includes presenting a plurality of second images to a user (operation 1306). In at least one embodiment, the second images may include the same or similar distinguishing features as the first images. In other embodiments, the second images may include different distinguishing features than the first images. For example, each second image may be comprised of the base object and a different type of second distinguishing feature, such as a head with different types of eyes.

Operations 1304 and 1306 may be repeated for the number of symbols in the password. If the password is to contain four symbols, then operations 1304 and 1306 may be repeated twice such that the user selects a total of four distinguishing features to represent their password. For example, the user may select one distinguishing hair feature, one eye feature, one nose feature and one mouth feature. The selected distinguishing features may then be utilized for authentication purposes as described above.

Figure 14:
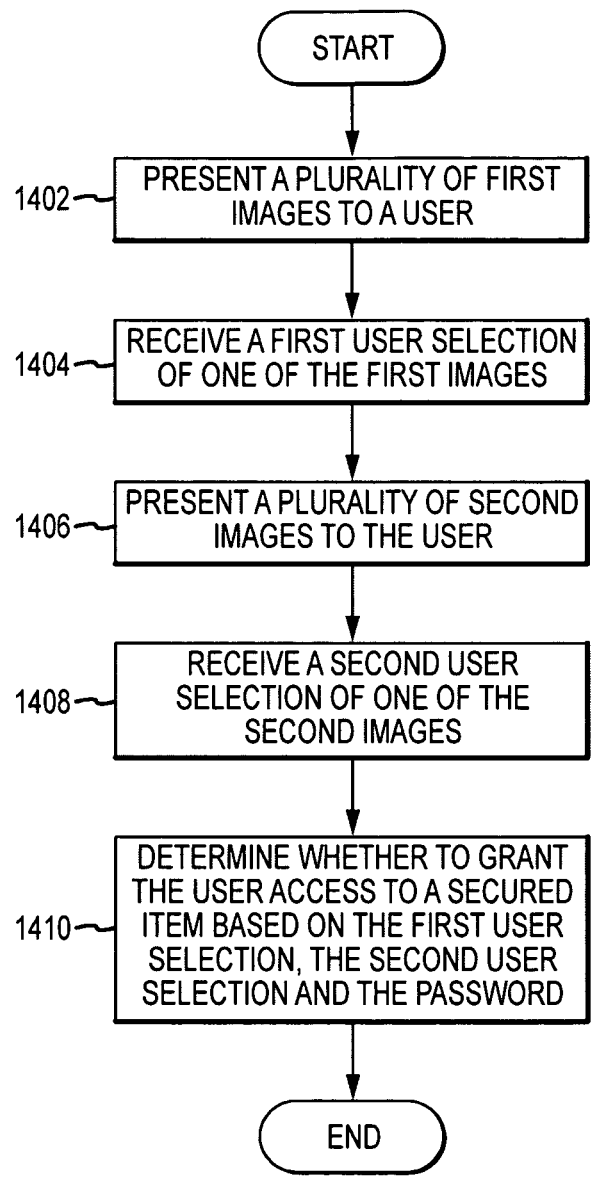
FIG. 14 illustrates an embodiment of a process for authenticating a user of a computing system.

FIG. 14 illustrates an embodiment of a process for authenticating a user of a computing system. More particularly, FIG. 14 illustrates a process for a user to provide password information to a computing system by selecting images that include distinguishing features corresponding with symbols of the user's password. FIG. 14 may include other operations not illustrated for the sake of brevity.

The process includes presenting a plurality of first images to a user (operation 1402). Each first image comprises a plurality of distinguishing features and a first of the distinguishing features corresponds with a first symbol of a password. For example, each image may be comprised of a man's head with differing eyes, mouths, hair/hats and noses. One of the images may include a man with a cowboy hat, and that particular image may correspond with the first symbol of the user's password.

The process further includes receiving a first user selection of one of the first images (operation 1404). The input the first symbol of the user's password, the user selects the image that includes the distinguishing feature that corresponds with the symbol of the password. For example, the user would select an image that includes a cowboy hat to input the first symbol of their password.

The process further includes presenting a plurality of second images to a user (operation 1406). Each second image comprises a plurality of second distinguishing features, and a second of the distinguishing features corresponds with a second symbol of the password. In some embodiments, the first and second distinguishing features may be the same and in some embodiments the first and second distinguishing features may be different. For example, the first distinguishing features may be eyes, whereas the second distinguishing features may be mouths.

In other embodiments, the distinguishing features may comprise any type of feature within the images, such as eyes, hair/hats, noses and mouths. Thus, the first symbol of the user's password may correspond with an image having a cowboy hat, whereas the second symbol of the user's password may correspond with an image having a baseball cap. In at least one embodiment, the user may utilize the same distinguishing feature for both the first and second symbols of their password. For example, the first symbol may be associated with an image having a cowboy hat, and the second symbol may also be associated with an image having a cowboy hat.

The process further includes receiving a second user selection of one of the second images (operation 1408). Operations 1406 and 1408 may be repeated for the input of additional symbols of the password. For example, if the password includes four symbols, then operations 1406 and 1408 would be performed a total of three times such that the user selects a total of four images during the operation of the process of FIG. 14. In at least one embodiment, the composition of the various images may be shuffled before the input of each symbol. In other words, if the images are comprised of a base object having varying interchangeable parts, then the various combinations of interchangeable parts may be shuffled during the receipt of input for each symbol.

The process further includes determining whether to grant the user access to a secured item based on the first user selection, the second user selection and the password (operation 1410). Thus, if the user selects the correct image for each symbol, then they are allowed access to the secured item. Conversely, if the user makes an incorrect image selection for one or more symbols, then the user is denied access to the secured item.

In at least one embodiment, the composition of the first and second images may be shuffled between login attempts. For example, if a user logs into the computing system on a Monday, then the composition of the images may be different during a new login session on Tuesday. Thus, if the images are comprised of a base object having varying interchangeable parts, then the various combinations of interchangeable parts may be shuffled during each user session.

Although specific embodiments were described herein, the scope of the invention is not limited to those specific embodiments. The scope of the invention is defined by the following claims and any equivalents therein.

What is claimed is:

1. A method for authenticating a user using a password that comprises a plurality of symbols, the method comprising:
   presenting a plurality of first images to a user, wherein each first image is constructed using at least one of a plurality of first distinguishing features so that the first distinguishing features are distributed amongst different first images, wherein each first distinguishing feature is only a portion of the image, and wherein only a single defined one of the first distinguishing features corresponds with a first symbol of the password;
   receiving a first user selection of a selected one of the first images;
   subsequently presenting a plurality of second images that are different from the first images to the user, wherein each second image is constructed using at least one of a plurality of second distinguishing features so that the second distinguishing features are distributed amongst different second images, wherein each second distinguishing feature is only a portion of the image, and wherein only a single second defined one of the second distinguishing features corresponds with a second symbol of the password;
   receiving a second user selection of a selected one of the second images; and
   determining to grant the user access to a secured item only if the first user selection corresponds to the one of the plurality of first images that includes the first defined one of the distinguishing features that corresponds with the first symbol of the password and the second user selection corresponds to the one of the plurality of second images that includes the second defined one of the distinguishing features that corresponds with the second symbol of the password.

2. The method of claim 1, wherein each of the plurality of first images is comprised of a base object and a plurality of interchangeable parts.

3. The method of claim 2, wherein presenting the plurality of second images further comprises: shuffling combinations of the plurality of interchangeable parts.

4. The method of claim 2, wherein each of the plurality of interchangeable parts is unique within the plurality of first images.

5. The method of claim 2, wherein each of the plurality of interchangeable parts is associated with a character of an alphabet associated with the first symbol.

6. The method of claim 2, wherein different combinations of the plurality of interchangeable parts are associated with particular characters of an alphabet associated with the first symbol.

7. The method of claim 2, wherein the plurality of first and second distinguishing features are comprised of at least a subset of common features.

8. The method of claim 7, wherein the plurality of first and second distinguishing features are comprised of the same set of features.

9. A method for authenticating a user, the method comprising:
   presenting a plurality of first images to a user, wherein each first image is constructed using at least one of a first plurality of distinguishing features so that the first distinguishing features are distributed amongst different first images, wherein each first distinguishing feature is only a portion of the image, and wherein only a first one of the distinguishing features corresponds with a first password symbol;
   receiving a first user selection of at least one of the first images;
   determining whether to grant the user access to a secured item based on whether the image selected in the first user selection comprises the distinguishing feature that corresponds with the first password symbol;
   presenting a plurality of second images to the user, wherein the second plurality of images are different from the first plurality of images and wherein each second image is constructed using at least one of a second plurality of distinguishing features so that the second distinguishing features are distributed amongst different second images, wherein each second distinguishing feature is only a portion of the second image, and wherein only a second one of the second plurality of distinguishing features corresponds to a second password symbol;
   receiving a second user selection of at least one of the second images; and
   determining whether to grant the user access to the secured item based on whether the image selected in the second user selection comprises the distinguishing feature that corresponds to the second password symbol.

10. The method of claim 9, wherein each of the plurality of first images is comprised of a base object, and wherein the first plurality of distinguishing features comprise combinations of the plurality of interchangeable parts.

11. The method of claim 9, wherein presenting the plurality of second images further comprises: shuffling the combinations of the plurality of interchangeable parts to generate the second plurality of distinguishing features.

12. The method of claim 9, wherein the first plurality of distinguishing features and the second plurality of distinguishing features comprises at least a subset of common elements.

13. An apparatus comprising:
   an output interface that outputs a plurality of first images to a user, each first image comprising at least one of a plurality of first distinguishing features, wherein each first distinguishing feature is only a portion of the first image and wherein only a defined one of the plurality of first distinguishing features corresponds with a first symbol of a password;
   an input interface that receives a first user selection of a selected one of the first images;
   the output interface outputting a plurality of second images to the user responsive to the first user selection, each second image comprising at least one of a plurality of second distinguishing features, wherein each first distinguishing feature is only a portion of the first image and wherein only a defined one of the second distinguishing features corresponding with a second symbol of the password;
   the input interface receiving a second user selection of a selected one of the second images; and
   a processor that determines whether to grant the user access to a secured item only if the first user selection and the second user selection correspond to the first and second images having the distinguishing features that comprise the first and second symbols of the password.

14. The apparatus of claim 13, wherein each of the plurality of first images is comprised of a base object and a plurality of interchangeable parts, and wherein the output interface shuffles combinations of the plurality of interchangeable parts to generate the plurality of second images.

15. The apparatus of claim 13, wherein each of the plurality of interchangeable parts is unique within the plurality of first images, and wherein each of the plurality of interchangeable parts is associated with a character of an alphabet associated with the first symbol.

16. An entertainment device comprising:
an input interface that receives video programming from a programming source;
a processor communicatively coupled to the input interface that controls access to at least one feature of the entertainment device; and
a wireless receiver communicatively coupled to the processor that receives input from a remote control associated with the entertainment device;
wherein the processor:
receives a request to access the at least one feature of the entertainment device;
outputs, responsive to the request, a plurality of first images for display on a display device, each first image comprising a base object and a first combination of a plurality of interchangeable parts, wherein each of the interchangeable parts represents only a portion of the first image, and wherein only one of the interchangeable parts is associated with a first symbol of a password of a user;
receives a first user selection of one of the first images, from the wireless receiver, the image associated with the first user selection corresponding with the first symbol of the password of the user;
outputting a plurality of second images for display on the display device, responsive to the first user selection, each second image comprising the base object and a second combination of the plurality of interchangeable parts, wherein each of the interchangeable parts represents only a portion of the second image, and wherein only one of the interchangeable parts is associated with a second symbol of the password;
receives a second user selection of one of the second images, from the wireless receiver, wherein the selected one of the second images is associated with the second user selection corresponding with a second symbol of the password; and
determines to grant the user access to the at least one feature of the entertainment device only if the first user selection corresponds to the one of the plurality of first images that includes the first defined one of the interchangeable parts that corresponds with the first symbol of the password and the second user selection corresponds to the one of the plurality of second images that includes the second defined one of the interchangeable parts that corresponds with the second symbol of the password.

17. The entertainment device of claim 16, wherein the at least one feature comprises stored content resident on the entertainment device.

18. The entertainment device of claim 17, wherein the at least one feature comprises a channel of the entertainment device.

19. The entertainment device of claim 16, wherein the at least one feature comprises editing a setting of the entertainment device.

20. A method for authenticating a user using a password, the method comprising:
presenting a plurality of first images to a user, each first image comprising a plurality of unique distinguishing features associated with at least one base image so that the unique distinguishing features are distributed amongst the plurality of first images, wherein each unique distinguishing feature makes up only a portion of the image, and wherein only a defined one of the unique distinguishing features corresponds with the password;
receiving a first user selection of a selected one of the first images;
granting the user access to a secured item only if the first user selection corresponds to the first image having the distinguishing feature that corresponds to the password; and
during subsequent attempts to authenticate the user, presenting a plurality of second images that are different from the first images to the user, wherein each of the second images is constructed from a different combination of the same unique distinguishing features used in the plurality of first images, and wherein the same defined one of the unique distinguishing features corresponds to the password to be selected from the plurality of second images.

21. The method of claim 20 wherein the plurality of second images uses a different base image than the plurality of first images.

22. The method of claim 21 wherein the plurality of second images uses the same distinguishing features as the plurality of first images, but in different combinations.

* * * * *